United States Patent
Barringer et al.

(10) Patent No.: US 6,794,571 B1
(45) Date of Patent: Sep. 21, 2004

(54) EMC SEALING SYSTEM AND METHOD FOR AN ELECTRICAL ENCLOSURE

(75) Inventors: Dennis R. Barringer, Wallkill, NY (US); Daniel J. Kearney, Ulster Park, NY (US); Steven C. McIntosh, Kingston, NY (US); Edward J. Seminaro, Milton, NY (US); Prabjit Singh, Poughkeepsie, NY (US); Harold M. Toffler, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/701,578

(22) Filed: Nov. 5, 2003

(51) Int. Cl.[7] .................................................. H05K 9/00
(52) U.S. Cl. ................................ 174/35 GC; 277/919; 277/920
(58) Field of Search ...................... 174/35 GC, 35 R, 174/35 MS; 361/799, 800, 816, 818, 752, 753; 277/919, 920, 939

(56) References Cited

U.S. PATENT DOCUMENTS

| | | | |
|---|---|---|---|
| 3,904,810 A | * | 9/1975 | Kraus .................... 174/35 MS |
| 5,001,297 A | * | 3/1991 | Peregrim et al. ....... 174/35 GC |
| 6,043,991 A | * | 3/2000 | Sorrentino .................. 361/816 |
| 6,259,609 B1 | | 7/2001 | Kurz .......................... 361/818 |
| 6,320,120 B1 | * | 11/2001 | Van Haaster .......... 174/35 GC |
| 6,362,416 B1 | | 3/2002 | Denny et al. ............. 174/35 R |

* cited by examiner

Primary Examiner—Anthony Dinkins
Assistant Examiner—Carmelo Oliva
(74) Attorney, Agent, or Firm—Floyd A. Gonzalez; Cantor Colburn LLP (57) ABSTRACT

A method and apparatus for providing an electromagnetic conduction seal in a device disposed within an electrical enclosure includes a metal EMC gasket defined by a first end an and opposite second end. The first end is operably secured to the device and at least the second end is allowed to float while remaining in electrical contact with the device. A lock strip is fixed to the device and is configured to provide limits of deflection of an intermediate portion of the gasket intermediate the first and second ends and captivate at least one floating end of the gasket. The intermediate portion provides an electromagnetic conduction seal between the device and with at least one of another device and/or the electrical enclosure.

20 Claims, 7 Drawing Sheets

EMC SEALING SYSTEM AND METHOD FOR AN ELECTRICAL ENCLOSURE

FIELD OF THE INVENTION

The present invention relates generally to an EMC sealing system and method for an electrical enclosure. More particularly, the present invention is directed to a dynamic EMC sealing system incorporated with a docking cassette for printed circuit boards that provides a level of EMC shielding.

BACKGROUND OF THE INVENTION

The past twenty-five or so years have seen the development of ever smaller electrical circuit components at the chip level. However, to take fullest advantage of achievements in electrical circuit miniaturization, one must package the resultant printed circuit cards containing these chips in an efficient manner. Clearly, the packaging of printed circuit cards in tight spaces is a direct logical extension of increasing chip level circuit densities. It should also be noted that the tight packaging of integrated circuit chips on printed circuit cards and the correspondingly dense packaging of the printed circuit cards is a design goal that is carried out for more than just the convenience of compactness. Compactness provides shorter distances between circuit components which, in turn, serves the very desirable goal of being able to operate the circuits effectively at higher frequencies, thus increasing the speed of numerous different forms of electrical systems, including but not limited to data processing systems.

Moreover, mainly for reasons associated with long-term system operation and reliability, it is likewise very desirable to be able to easily insert and remove these printed circuit cards even when they are disposed in very tight spaces. The insertion and removal operations are also provided as an important part of a "hot-pluggability" function which is very desirable for "on the fly" repairs, replacements, maintenance and upgrades. Accordingly, to whatever extent possible, packaging designs should be: economical to produce; function smoothly, require little or no maintenance; be producible from inexpensive, readily available materials; and be reliably operable over a large number of insertion and removal operation cycles.

Yet one other concern arises in electrical systems as circuit feature size shrinks, operating frequencies increase and packaging densities grow larger, namely, the generation of electromagnetic interference (EMI). Electronic circuit packaging designs should thus also be compatible with structures and configurations that are employed to prevent the leakage of electromagnetic interference. To whatever extent possible, packaging designs should also include structures which actually contribute positively to the containment of electromagnetic interference. There is an ever increasing problem of electromagnetic interference caused by such devices. Virtually every electronic device, intentionally or not, emits some form of electromagnetic radiation. While this condition could be tolerated when few devices existed, the increasing number of electronic devices has made the problem more acute. The problem has been exacerbated by the "improvement" in semiconductor devices which allows them to operate at higher speeds, generally causing emission in the higher frequency bands where interference is more likely to occur. Successful minimization of the interference problem, sometimes referred to as "electromagnetic compatibility" or "EMC", generally requires that emissions from a given device be reduced by shielding and other means, and shielding be employed to reduce the sensitivity of a device to fields from other devices. Since shielding helps to reduce sensitivity to external fields as well as reduce emissions from the device, it is a common approach to a solution of the problem.

In newer high speed packages it is necessary to use a metallic type of gasket to provide better conduction with an electrical enclosure in which the printed circuit cards are engaged. However, use of known metallic gaskets are susceptible to damage such as bending or breaking. The gasket is commonly "damaged" as a result of over deflection of the gasket. Once the metallic gasket is damaged, the gasket does not provide the intended function. Moreover, if the gasket actually breaks, the gasket poses a threat for a potential short.

It is also noted that the present discussion refers to printed circuit boards and printed circuit cards. As contemplated herein, the printed circuit board is the larger component into which at least one printed circuit card is inserted for purposes of electrical connection. The present disclosure places no specific limits on either the size of a printed circuit board or the size of a printed circuit card. In the most general situation, a circuit board will be populated with a plurality of printed circuit cards. That is, the printed board will have a number of printed circuit cards inserted therein.

Accordingly, as used herein, the terms "printed circuit board" and "printed circuit card" are considered to be relative terms.

Accordingly, the present inventors are presented with the following sometimes competing packaging problems: dense and close packaging, electromagnetic interference shielding, hot pluggability, the desire to provide an easy-to-load cartridge for carrying printed circuit cards, the removal of fully populated printed circuit boards and the insertion thereof, and means to provide a dynamic cooperative EMI shielding arrangement in a system which also provides repeated circuit board insertion and removal of these printed circuit cards therefrom without damage to the arrangement.

SUMMARY OF THE INVENTION

An apparatus for providing an electromagnetic conduction seal in a device disposed within an electrical enclosure is disclosed. The apparatus includes a metal EMC gasket defined by a first end and an opposite second end. The first end is operably secured to the device and at least the second end is allowed to float while remaining in electrical contact with the device. A lock strip is fixed to the device and is configured to provide limits of deflection of an intermediate portion of the gasket intermediate the first and second ends and captivate at least one floating end of the gasket. The intermediate portion provides an electromagnetic conduction seal between the device and with at least one of another device and/or the electrical enclosure.

In another embodiment, a method for providing an electromagnetic conduction seal in a device disposed within an electrical enclosure is disclosed. The method includes configuring a metal EMC gasket defined by a first end and an opposite second end, the first end is operably secured to the device, at least the second end is allowed to float while remaining in electrical contact with the device; fixing a lock strip to the device; configuring the lock strip to provide limits of deflection of an intermediate portion of the gasket intermediate the first and second ends; and captivating at least one floating end of the gasket, wherein the intermediate portion provides an electromagnetic conduction seal

BRIEF DESCRIPTION OF THE DRAWINGS

Referring now to the figures, which are exemplary embodiments, and wherein the like elements are numbered alike.

DETAILED DESCRIPTION OF THE INVENTION

Referring generally to the figures, a docking apparatus 1 for mounting a printed circuit board (PCB) into a computer system is shown, in accordance with an embodiment of the invention. Docking apparatus 1 preferably provides structural support to the PCB so as to allow for the easy insertion and removal of the PCB from a computer system, as well as thermal and electrical isolation from other PCB's and components within the computer system. It will also be noted that although the present invention will be described with reference to providing an EMC seal with respect to docking apparatus 1 and a computer system, that the present invention may be employed with other devices in conjunction with an electrical enclosure.

Figures 1, 2:
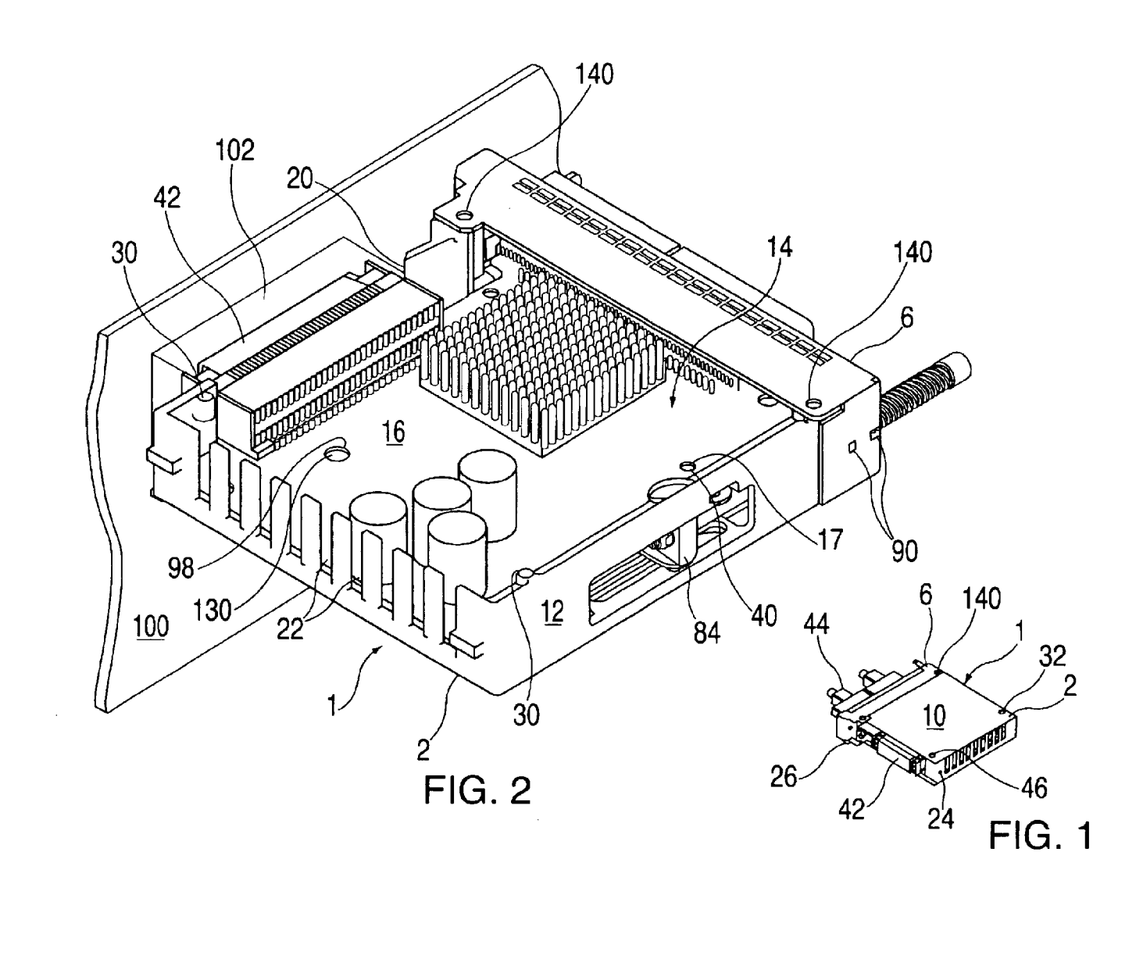
FIG. 1 is a perspective view of a docking cassette in accordance with an embodiment of the invention.
FIG. 2 is a perspective view of the docking cassette of FIG. 1 with a cover removed and beginning mating interconnection with a corresponding card connector in accordance with an exemplary embodiment of the invention.
Figure 3:
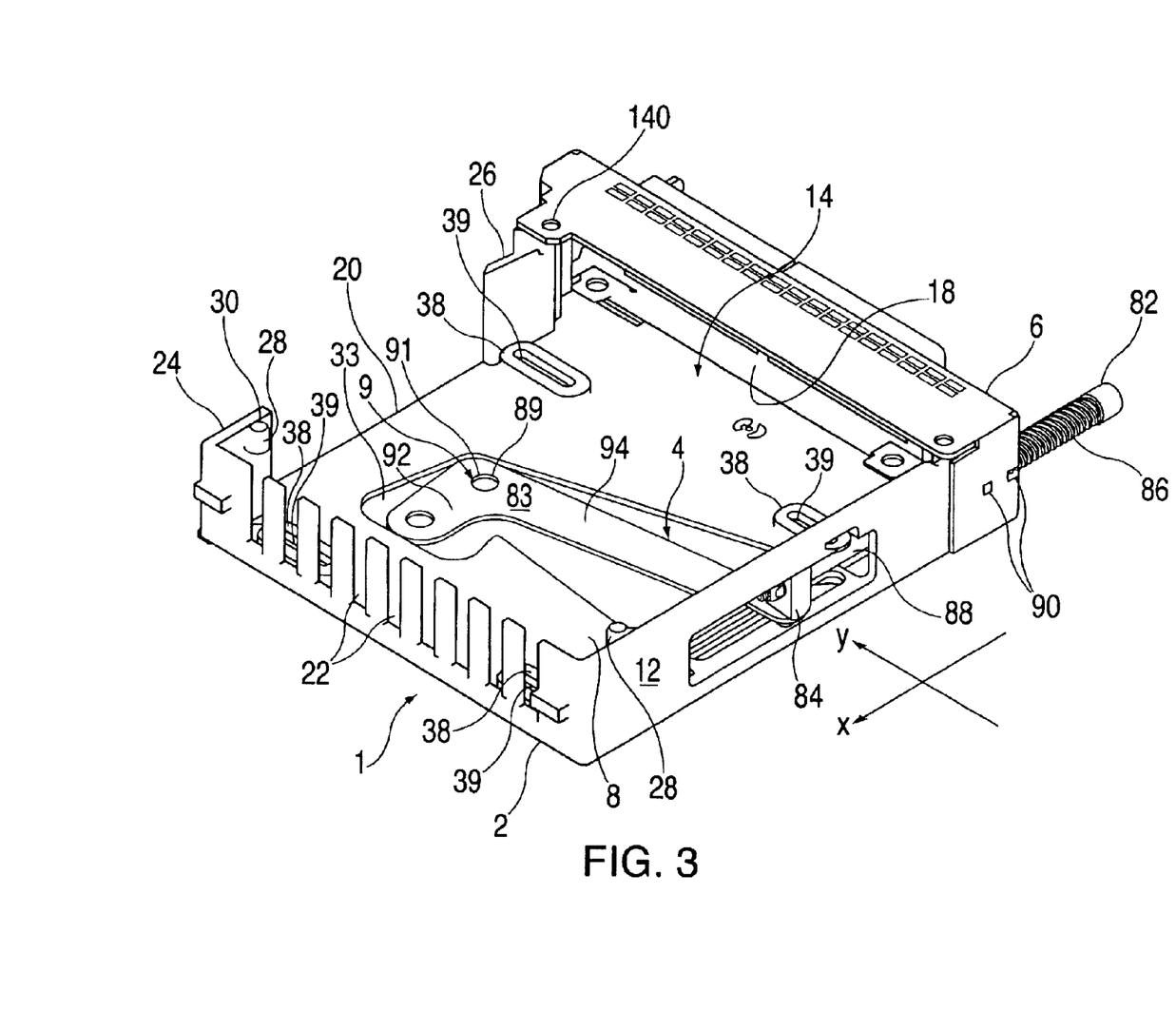
FIG. 3 is a perspective view of FIG. 2 illustrating the docking cassette shown removed from the card connector and card removed therefrom.

Referring to FIG. 1, FIG. 2, and FIG. 3, a docking apparatus 1 for mounting a printed circuit board (PCB) in a computer system is shown, in accordance with an embodiment of the invention. Docking apparatus 1 preferably includes a cassette housing 2, a linkage mechanism 4 and a housing bezel 6. Cassette housing 2 preferably includes a housing base 8, a housing cover 10 and a housing wall 12, wherein housing base 8 and housing wall 12 are non-movably associated with each other and disposed relative to each other so as to define a housing cavity 14 for movably containing a PCB 16.

In accordance with an exemplary embodiment, housing base 8 preferably includes a linkage cavity 33 and four mounting devices 38 for movably holding PCB 16. PCB 16 preferably includes a PCB mounting mechanism 40 and mounting device 38 preferably includes a device opening 39 for slidingly containing PCB mounting mechanism 40, wherein PCB mounting mechanism 40 may be a screw, a pin or any mounting mechanism suitable to the desired end purpose. In addition, housing base 8 preferably includes a linkage mounting receptacle shown generally at 9 configured in cavity 33 for associating driving mechanism 4 with housing base 8. In accordance with an exemplary embodiment, although linkage mounting receptacle 9 is preferably a receptacle opening for receiving a linkage mounting screw 91, linkage mounting receptacle 9 may be any receptacle device suitable to the desired end purpose, such as a clip receptacle. In accordance with an exemplary embodiment, it is considered within the scope of the invention that PCB 16 may be movably associated with housing base 8 using any device or method suitable to the desired end purpose, such as a screw or pin.

Housing wall 12 preferably includes a cable opening 18, a PCB connector opening 20 and a plurality of vent openings 22. In addition, housing wall 12 preferably includes a first protrusion 24 and a second protrusion 26 (FIG. 2), wherein first protrusion 24 and second protrusion 26 are disposed so as to lockingly engage with a main board 100 of a computer system. In accordance with an embodiment of the invention, first protrusion 24 and second protrusion 26 are shown as being disposed on housing wall 12. However, it is considered within the scope of the invention that first protrusion 24 and second protrusion 26 may be disposed anywhere on cassette housing 2 in a manner suitable to the desired end purpose. Moreover, housing wall 12 preferably includes at least one mounting structure 28 which defines a threaded cavity 30 for receiving a mounting apparatus 32 (FIG. 1), such as a screw. In addition, PCB connector opening 20 and cable opening 18 are preferably disposed so as to allow communication with the PCB connector 42 and the PCB cable connections 44 when PCB 16 is disposed within housing cavity 14.

Housing cover 10 preferably includes at least one cover opening disposed so as to allow communication with mounting structure 28 when housing cover 10 is associated with housing wall 12. Each cover opening 46 is preferably disposed so as to allow mounting apparatus 32 to communicate with threaded cavity 30 for non-movably associating housing cover 10 with housing wall 12. Although an exemplary embodiment describes housing cover 10 being non-movably associated with housing wall 12, it is considered within the scope of the invention that housing cover 10 may also be non-movably associated with housing base 8 and/or housing wall 12 using any mounting device or method suitable to the desired end purpose.

Referring to FIG. 3, linkage mechanism 4 is described and preferably includes a linkage arm 83 and a clevis 84 pivotally coupled to linkage arm 83 and configured to receive a first end of a shaft 88 therethrough while a second end of shaft 88 includes a thread 86 engaged with an operably fixed nut (not shown) secured to either housing 2 and/or housing bezel 6. Linkage arm 83 is preferably pivotally associated with clevis 84 and the first end of the shaft 88 is pivotally associated with an aperture configured in clevis 84. In accordance with an exemplary embodiment, linkage mechanism 4 is operably mounted within housing cavity 14 via a complimentary configured aperture 89 for receiving linkage mounting screw 91 allowing pivotal movement of linkage arm 83 about screw 91 or with any mounting device suitable to the desired end purpose, such as a clip. Further, linkage mechanism 4 is operably mounted within housing cavity 14 via the nut operably secured to housing bezel 6 and associated with thread 86.

Linkage arm 83 includes a first link arm 92 and a second link arm 94 substantially extending from aperture 89 and perpendicular to each other. First link arm 92 includes a first aperture 96 for operable connection with a corresponding aperture 98 aligned therewith and configured in PCB 16 for connecting PCB 16 to first link arm 92 (FIG. 2). In this manner, when linkage arm 83 pivots about screw 91, PCB connector 42 electrically engages and disengages with a respective connector 102 in board 100 (See FIG. 1). Second link arm 94 includes a second aperture proximate an end thereof for pivotally coupling with clevis 84. In an exemplary embodiment, second link arm 94 is about four times the length of first arm link 92, thus providing a 4:1 mechanical advantage with respect to engaging and disengaging PCB 16 with board 100 via manipulation of second link arm 94 proximate an end having clevis 84 coupled thereto. It will be noted that other lengths of arms 92, 94 are contemplated depending on the mechanical advantage desired.

Referring to FIGS. 1–3, a docking apparatus 1 containing a PCB 16 having a PCB mounting hole 17 is shown and discussed, wherein the docking apparatus 1 is disposed within a computer system. Linkage mechanism 4 is disposed within housing cavity 14 such that linkage arm 83 is 5 communicated with linkage mounting receptacle 9 via aperture 89. Linkage mechanism 4 is then pivotally associated with housing base 8 via linkage arm 83 and linkage mounting receptacle 9 using linkage mounting screw 91. In accordance with an exemplary embodiment, PCB 16 is then disposed within housing cavity 14 so as to allow communication with PCB connector 42 and PCB cable connections 44 through PCB connector opening 20 and cable opening 18, respectively. In addition, PCB 16 is disposed within housing cavity 14 so as to allow communication with mounting device 38 through PCB mounting hole 17. PCB 16 is preferably movably associated with housing base 8 using PCB mounting mechanism 40.

Figure 4:
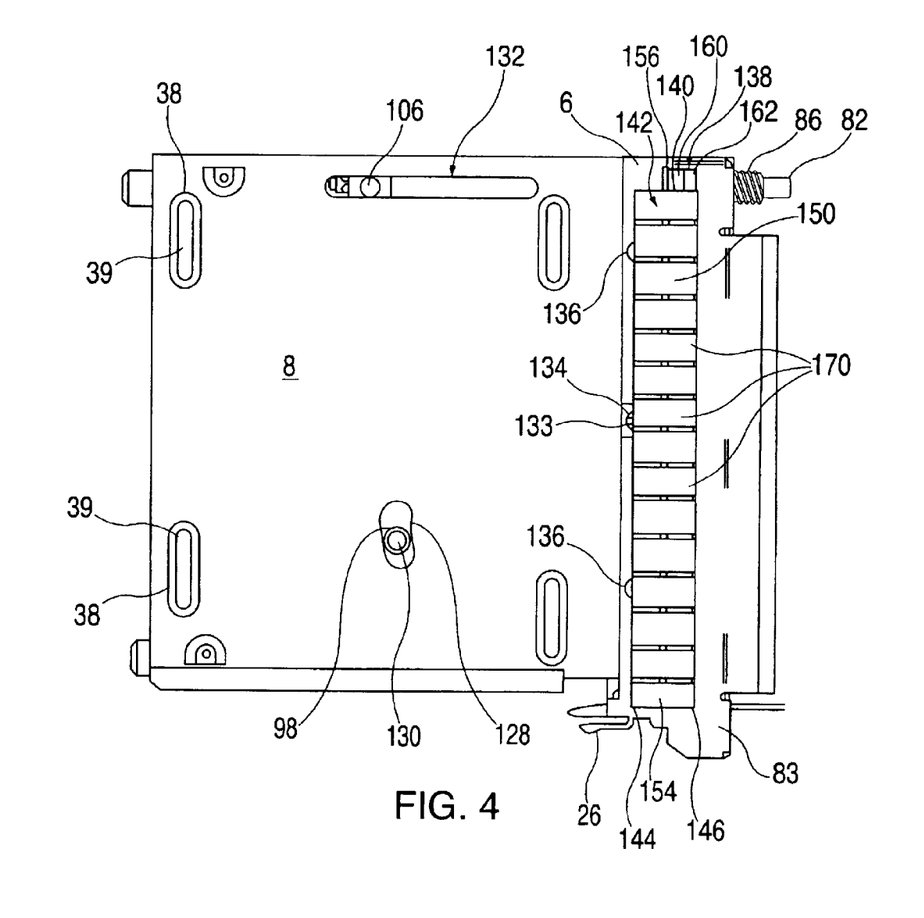
FIG. 4 is a backside view of the docking cassette shown in FIG. 3 illustrating an exemplary embodiment of a metal EMC gasket retained thereto with a lock strip chemically bonded to a conductive housing bezel of the docking cassette.

Still referring to FIGS. 1–3 with specific reference to FIG. 4, base 8 includes an arcuate slot 128 which receives a pin 130 extending through aperture 96 of link arm 83 for connection with PCB 16 (See also FIG. 2). Moreover, base 8 preferably includes a slot 132 disposed therein so as to be communicated with pin 106 extending from a bottom surface of clevis 87 for guiding the same. Base 8 is operably fixed to housing bezel 6 via a snap-fit feature 133 extending from base 8 through an aperture 134 in housing bezel 6 aligned therewith. Apertures on either side of snap-fit feature 133 on housing bezel 6 are configured to receive alignment pins 136 extending from base 8 to operably fix housing bezel 6 with respect to base 8. Housing bezel 6 further includes an EMC sealing assembly 138 operably disposed on at least one side along a substantial length defining a length of the conductive housing bezel 6 which is in electrical communication with PCB 16. More specifically with reference to FIG. 5, housing bezel 6 includes an inner bezel 76 and an outer bezel 83 in slidable electrical communication via an EMC gasket (not shown) therebetween. Inner bezel 76 further includes a mounting lip configured to mount PCB 16 in an offset position within docking apparatus 10 so that a bottom surface of PCB 16 is not directly positioned against housing base 8.

Figure 5:
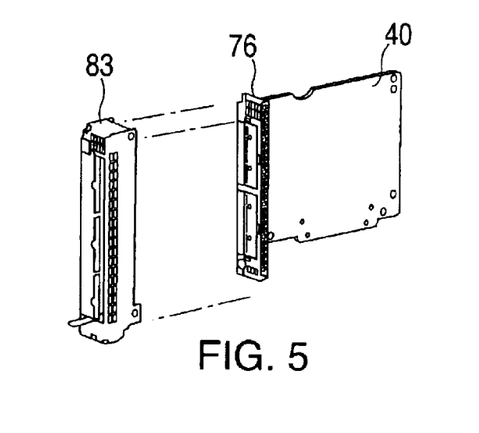
FIG. 5 is an exploded perspective view of the exemplary housing bezel of FIG. 4 including an outer bezel and an inner bezel attached to the printed circuit card.
Figure 6:
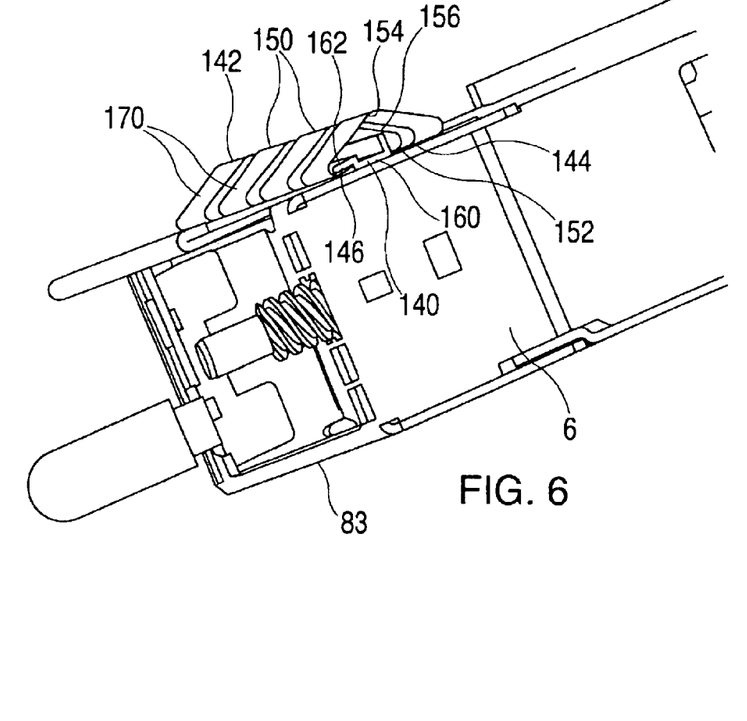
FIG. 6 is an enlarged partial top perspective view illustrating the segmented EMC gasket of FIG. 4 operably retained by the lock strip in accordance with an embodiment of the invention.
Figure 7:
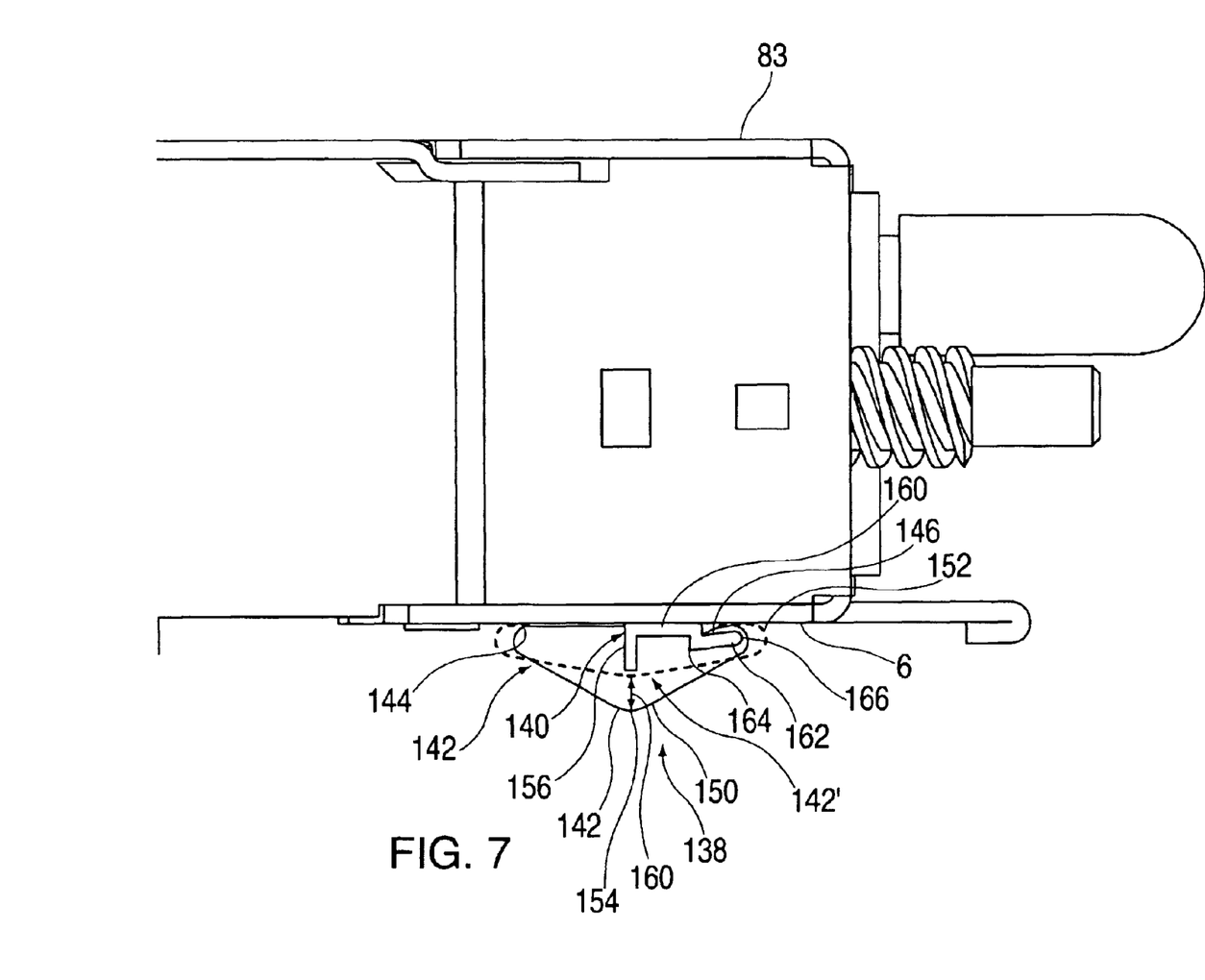
FIG. 7 is a partial bottom view of an exemplary embodiment of the EMC gasket and lock strip of FIG. 4 illustrating engagement therebetween including a fully flexed and still captivated position of the gasket.

Referring to FIGS. 4, 6 and 7, EMC sealing assembly 138 includes a lock strip 140 operably fixed to at least one side defining outer bezel 83 and a metal EMC gasket 142 defined by a first end 144 and an opposite second end 146. The first end 144 is operably secured to at least one of outer bezel 83 or the lock strip 140 while at least the second end 144 is allowed to float while remaining in electrical contact with the conductive outer bezel 83. As illustrated in FIGS. 4–6, first end 144 is chemically bonded to outer bezel 83 using an adhesive therebetween. Lock strip 140 is also secured to outer bezel 83 using the same adhesive.

Lock strip 140 is configured to provide limits of deflection of an intermediate portion 150 of gasket 142 intermediate first and second ends 144, 146 and captivate at least one floating end 144, 146 of gasket 142. As illustrated in FIGS. 4, 6 and 7, second end 146 is captivated by lock strip 140 while second end 146 maintains electrical continuity with outer bezel 83 generally indicated at 152 in FIGS. 6 and 7. Intermediate portion 150 provides an electromagnetic conduction seal between PCB 16 in electrical communication with outer bezel 83 via second end 146 and with at least another docking apparatus 1 or electrical enclosure 200 in which it is engaged with (see FIG. 9). In one embodiment, intermediate portion 150 of gasket 142 includes a bight portion 154 configured to flex toward lock strip 140 allowing the docking apparatus 1 extraction and insertion while still making a suitable ground contact.

Lock strip 140 is configured to provide limits of deflection of intermediate portion 150 of gasket 142 intermediate first and second ends 144, 146 using a member 156 extending toward bight portion 154 a distance 160 therefrom representing a limit of deflection as best seen with reference to FIG. 7 where a deflected gasket 142' is shown in phantom. Lock strip 140 includes a base 160 adhesively bonded, using glue, for example, to outer bezel 83. Lock strip 140 further includes member 156 extending from base 160 toward bight portion 154 of intermediate portion 150 of gasket 142, and an arm 162 extending from base 160. However, it will be recognized by one skilled in the pertinent art that arm 162 optionally may extend from member 156. Arm 162 is configured to captivate second end 146 between arm 162 and housing bezel 6 and allow float of the same while maintaining electrical communication between second end 146 and bezel 83.

In an exemplary embodiment with reference to FIGS. 4, 6 and 7, arm 162 is configured with an offset 164 defined by an end portion 166 substantially parallel to base 160 or preferably with a slight inclination towards base 160 to aide captivation of second end 146.

Figures 8, 9:
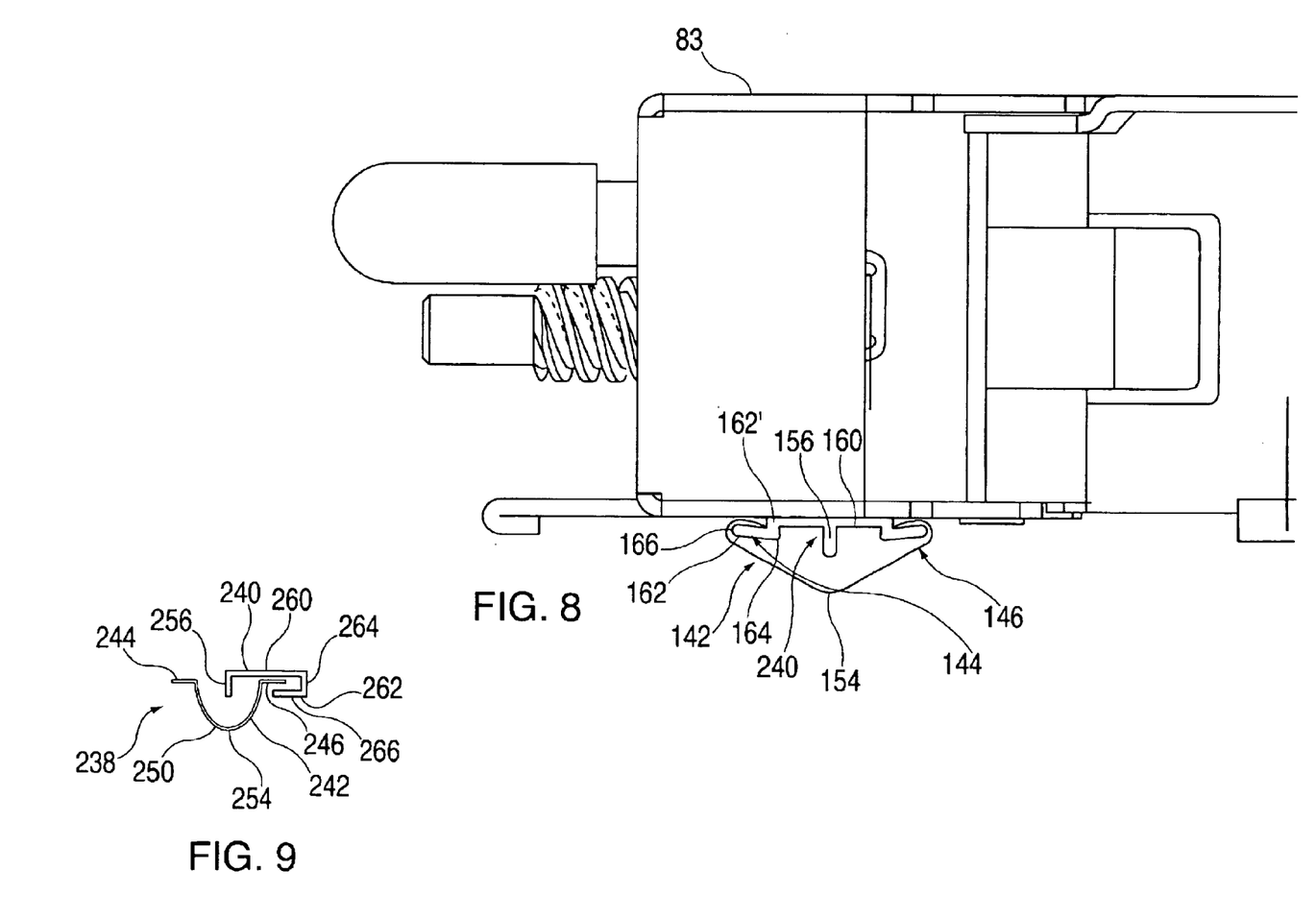
FIG. 8 is a partial bottom reversed view of FIG. 6 illustrating an alternative embodiment of a lock strip for use with the EMC gasket of FIGS. 4–6 in accordance with an embodiment of the invention.
FIG. 9 is a cross section view of an alternative embodiment of a metal EMC gasket and associated lock strip.

Referring now to FIG. 8, an alternative embodiment of a lock strip 140 of FIGS. 4, 6 and 7 is illustrated at 240. Lock strip 240 is configured to captivate both ends 144, 146 of gasket 142 while allowing float of both ends 144,146 while both ends 144, 146 maintain electrical connection to outer bezel 83 when bight portion 154 is operably compressed. In this manner, first end 144 is not fixed with respect to outer bezel 83, since first end 144 is not adhesively bonded to outer bezel 83. Lock strip 240 is configured with another arm 162' extending from base 160. Ann 162' is configured with an offset 164 defined by an end portion 166 substantially parallel to base 160 or preferably with a slight inclination towards base 160 to aide captivation of first end 144.

Referring again to FIGS. 4 and 6–8, gasket 142 is preferably configured substantially as a D-ring having first and seconds ends 144, 146 extending toward each other at an angle substantially parallel to an angle of intermediate portion 150 forming bight portion 154. Gasket 142 may also be U-shaped where bight portion 154 corresponds with a bight in the "U" having first and second ends 144, 146 extending toward each other extending from ends defining the "U".

In an exemplary embodiment, intermediate portion 150 having bight portion 154 is segmented transversely along a length defining gasket 142 to facilitate compression thereof. Referring to FIG. 4, gasket 142 includes fifteen segments 170 defining intermediate portion 150, however any number of segments may be employed suitable for its intended purpose. Furthermore, it will be pointed out that EMC gasket 142 is configured for use with differently configured housings or housing bezels used in different electrical enclosures 200.

Referring now to FIG. 9, for example, an alternative embodiment of an EMC gasket assembly 238 is illustrated. Assembly 238 includes a metal EMC gasket 242 defined by first and second ends 244, 246 extending away from each other extending from ends defining a "U". First and' second ends 244, 246 are separated by an intermediate portion 250 defining gasket 242. First end 244 may be secured to outer bezel 83 while second end 246 is captivated, but allowed to float, with respect to a lock strip 240. Lock strip 240 is configured with a member 256 extending from a base 260 toward a bight portion 254 of intermediate portion 250, and an arm 262 extending from base 260. However, it will be recognized by one skilled in the pertinent art that arm 262 optionally may extend from member 256. Arm 262 is configured to captivate second end 246 between arm 262 and housing bezel 6 and allow float of the same while maintaining electrical communication between second end 246 and bezel 6. Arm 262 is configured with an offset 264 defined by an end portion 266 substantially parallel to base 260 or preferably with a slight inclination towards base 260 to aide captivation of second end 246. It will also be recognized by one skilled in the pertinent art that lock strip 240 is optionally configured with another arm opposite arm 262 configured to captivate and allow float of first end 244, similar to the embodiment of FIG. 8.

In operation with reference to the Figures, linkage mechanism 4 is preferably disposed within housing cavity 14 so as to be associated with linkage cavity 33 thus allowing linkage arm 83 to pivot without interference from housing base 8. Linkage mechanism 4 is preferably disposed within housing cavity 14 so as to be movably associated with PCB 16 such that at least a portion of shaft 88 is protruding from cable opening 18. Linkage mechanism 4 is preferably disposed such that when handle 82 is turned in one direction, PCB 16 is translated via linkage arm 83 and pin 130 in arcuate slot 128 such that PCB connector 42 is moved toward PCB connector opening 20. Likewise, when handle 82 is turned in an opposite direction, PCB 16 is translates such that PCB connector 42 is moved away from PCB connector opening 20. Housing cover is then disposed over housing cavity 14 so as to allow communication with threaded cavity 30 through cover opening 46.

Referring now to FIGS. 1–4, housing bezel 6 is preferably disposed over cable opening 18 so as to enclose housing cavity 14. In addition, housing bezel 6 is preferably disposed such that tail-stock mounting holes 140 are aligned with a corresponding cover opening 46 and threaded cavity 30. Housing cover 10, linkage mechanism 4 and outer bezel 83 are then non-movably associated with housing wall 12 using mounting apparatus 32.

Figure 10:
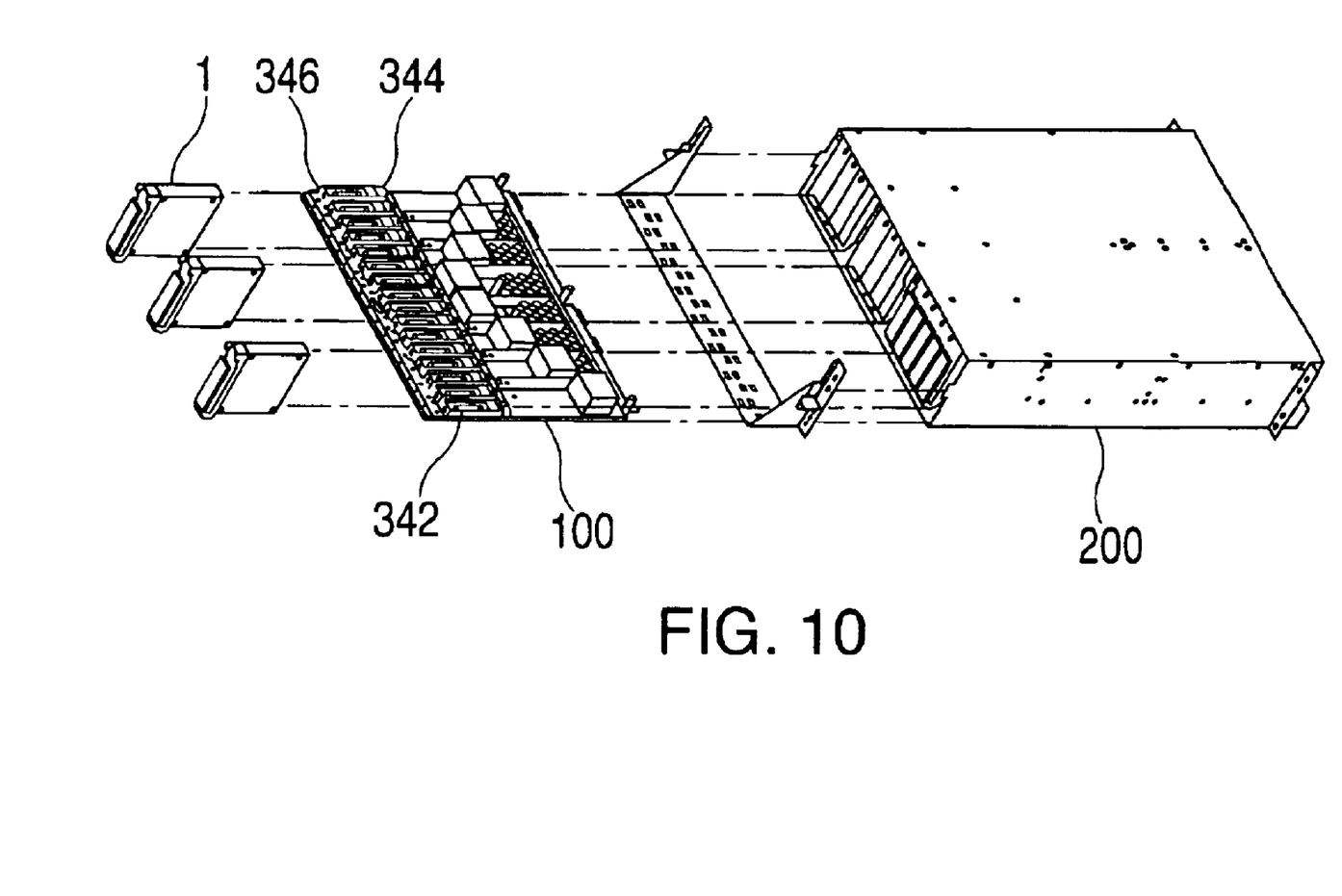
FIG. 10 is an exploded overall view of a docking cassette and a computer system in accordance with an embodiment of the invention.

In accordance with an exemplary embodiment and referring to FIG. 10, docking cassette 1 is then disposed onto a computer system main board 100 disposed within a electrical enclosure 200. Computer system main board 100 includes a PCB connector receptacle 342, a first receptacle 344 and a second receptacle 346. Docking cassette 1 is preferably disposed onto computer system main board 100 such that PCB connector 42 is adjacent to PCB connector receptacle 342. In addition, docking cassette 1 is preferably disposed such that first protrusion 24 is communicated with first receptacle 344 and second protrusion 26 is communicated with second receptacle 346 so as to non-movably associate docking cassette 1 with computer system main board 100. Handle 82 of shaft 88 is then turned so as to cause linkage arm 83 to pivot about screw 91 via connection through clevis 84 to move PCB 16 toward opening 20. This causes first link arm 92 to compress PCB 16 via pin 130 in such a manner so as to electrically communicate PCB connector 42 and PCB connector receptacle 342. Likewise, turning handle 82 of shaft 88 in an opposite direction so as to cause shaft 88 to translate out of housing cavity 14 to pivot link arm 83 will cause first link arm to decompress PCB 16 via pin 130 in such a manner so as to electrically discommunicate PCB connector 42 and PCB connector receptacle 342.

Although the present invention has been described in accordance with a docking cassette as it relates with a computer system, it will be understood that the present invention is not limited thereto and that the present invention may be incorporated for providing a dynamic EMC sealing system and method in for a device associated with any electrical enclosure.

Each gasket 42, 142 disclosed herein is configured to provide electrical continuity between PCC 40, inner bezel 76 and outer bezel 82, and another cassette or electrical enclosure, thus providing EMC shielding when the cassette is operably installed within an electrical enclosure. Each gasket is preferably segmented having an intermediate portion 150 configured having at least one bend or bight portion 154 in a length thereof intermediate ends 144, 146 or 244, 246 to increase compressibility of a resulting D-ring or U-shape structure formed by two legs defining intermediate portion 150. The D-ring or U-shaped structure is outlined with the two legs terminating forming bight portion 154 which substantially corresponds with a center of each segment and intermediate portion 150. D-ring or U-shape structure is compressible to provide electrical continuity between outer bezel 82 of housing bezel 6 and either another cassette or the electrical enclosure when gasket 142 or 242 is disposed therebetween, while allowing universal fit and adaptability. The compressible structure allows universal fit and adaptability because at least the lock strip is adhesively bonded to outer bezel 82 and allows installation with different dimensioned outer bezels 82 while maintaining EMC sealing as a result of the compressible intermediate portion 150 extending from ends 144, 146 or 244, 246 defining ends of gasket 142 or 242 to provide contact with outer bezel 82. It will be understood that although EMC gasket 142, 242 has been described with intermediate portion defining a "U" or D-ring, a number of different configurations may optionally be employed to provide suitable compressibility while limiting such with member 156, 256 of lock strip 140, 240, respectively. In addition, although raised intermediate portion 150 has been described as forming a D-ring or U-shape structure, more than two legs may be employed to form other configurations, such as, including for example, but not limited to, a hemisphere, a triangular frame structure, and the like.

In accordance with embodiments of the invention and referring to FIGS. 4 and 6–9, EMC gasket 142, 242 is preferably constructed from a rigid material having sufficient strength and electromagnetic compatibility properties, such as beryllium copper (BeCu) and/or stainless steel. However, it is considered within the scope of the invention that gasket 142, 242 may be constructed from any material suitable to the desired end purpose. It will also be understood that although EMC gasket has been described as having one end 144 fixed to outer bezel 83, a different configuration of lock strip 140 may be employed (lock strip 240 of FIG. 8) is contemplated to operably secure first end 144 such that both ends 144, 146 are allowed to float while remaining in electrical contact with outer bezel 83 as described above for one exemplary embodiment. The EMC gasket described herein is a movable seal that allows for PCC insertion and extraction with the docking cassette that is universally adaptable for use with differently configured housing bezels, while still making suitable ground contact and limiting the potential for breaking the metal gasket.

In accordance with an embodiment of the invention, housing base 8 and housing wall 12 are preferably constructed from a rigid material such as plastic (polycarbonate with glass filler). However, it is considered within the scope of the invention that housing base 8 and housing wall 12 may be constructed from any material suitable to the desired end purpose.

In accordance with an embodiment of the invention, housing cover 10 is preferably constructed from a rigid material such as plastic. However, it is considered within the scope of the invention that housing cover 10 may be constructed from any material suitable to the desired end purpose.

In accordance with an embodiment of the invention, linkage mechanism 4 is preferably constructed from a rigid material having sufficient strength, such as steel and/or stainless steel. However, it is considered within the scope of the invention that linkage mechanism 4 may be constructed from any material suitable to the desired end purpose.

In accordance with an embodiment of the invention, housing bezel 6, including inner and outer bezels 76, 83, is preferably constructed from a rigid material having sufficient strength, such as steel and/or stainless steel. However, it is considered within the scope of the invention that housing bezel 6 may be constructed from any material suitable to the desired end purpose.

In accordance with an embodiment of the invention, metal EMC gasket 142 is preferably constructed from a conductive metal, such as BeCu and /or stainless steel while the lock strip 140 is plastic adhesively bonded to the outer bezel.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for providing an electromagnetic conduction seal in a device disposed within an electrical enclosure comprising:

a metal EMC gasket defined by a first end and an opposite second end, said first end is operably secured to the device, at least said second end is allowed to float while remaining in electrical contact with the device; and a lock strip fixed to the device, said lock strip configured to provide limits of deflection of an intermediate portion of said gasket intermediate said first and second ends and captivate at least one floating end of the gasket;

wherein said intermediate portion provides an electromagnetic conduction seal between the device and with at least one of another device and the electrical enclosure.

2. The apparatus of claim 1, wherein when said lock strip is configured to captivate just said second end, said first end is fixed to the device.

3. The apparatus of claim 1, wherein said lock strip configured to provide limits of deflection of said intermediate portion of said gasket intermediate said first and second ends includes a member extending toward said intermediate portion a distance therefrom representing said limit of deflection.

4. The apparatus of claim 1, wherein said lock strip is defined by two opposite ends configured to each captivate but allow float of each of said first and second ends of said gasket.

5. The apparatus of claim 1, wherein said lock strip comprises:

a base fixed to the device;

a member extending from said base toward said intermediate portion of said gasket; and at least one arm extending from one of said base and said member, said at least arm configured to captivate one of said first and seconds ends between said arm and the device and allow float of the same.

6. The apparatus of claim 5, wherein said at least arm is configured having an offset arm defined by an end portion substantially parallel to said base.

7. The apparatus of claim 1, wherein said intermediate portion of said gasket is a bight portion configured to flex allowing the device extraction and insertion while still making a suitable ground contact.

8. The apparatus of claim 7, wherein said bight portion is segmented transversely along a length defining said gasket to facilitate compression thereof.

9. An apparatus for providing an electromagnetic conduction seal in a device disposed within an electrical enclosure, said apparatus comprising:

a housing, having a housing base, a housing cover and a housing wall, wherein said housing base and said housing wall are disposed relative to each other so as to define a housing cavity for containing an electrical device;

a housing bezel, said housing bezel is disposed relative to said housing so as to be associated with a cable opening and in electrical communication with the electrical device;

a metal EMC gasket defined by a first end and an opposite second end, said first end is operably secured to the device, at least said second end is allowed to float while remaining in electrical contact with the housing bezel; and a lock strip fixed to the housing bezel, said lock strip configured to provide limits of deflection of an intermediate portion of said gasket intermediate said first and second ends and captivate at least one floating end of the gasket;

wherein said intermediate portion provides an electromagnetic conduction seal between the device and with at least one of another device and the electrical enclosure providing electromagnetic shielding for the electrical device disposed within said housing.

10. The apparatus of claim 9, wherein when said lock strip is configured to captivate just said second end, said first end is fixed to the housing bezel.

11. The apparatus of claim 9, wherein said lock strip configured to provide limits of deflection of said intermediate portion of said gasket intermediate said first and second ends includes a member extending toward said intermediate portion a distance therefrom representing said limit of deflection.

12. The apparatus of claim 9, wherein said lock strip is defined by two opposite ends configured to each captivate but allow float of each of said first and second ends of said gasket.

13. The apparatus of claim 9, wherein said lock strip comprises:
- a base fixed to the housing bezel;
- a member extending from said base toward said intermediate portion of said gasket; and
- at least one arm extending from one of said base and said member, said at least arm configured to captivate one of said first and seconds ends between said arm and the device and allow float of the same.

14. The apparatus of claim 13, wherein said at least arm is configured having an offset arm defined by an end portion substantially parallel to said base.

15. The apparatus of claim 9, wherein said intermediate portion of said gasket is a bight portion configured to flex allowing housing extraction and insertion while still making a suitable ground contact.

16. The apparatus of claim 15 wherein said bight portion is segmented transversely along a length defining said gasket to facilitate compression thereof.

17. A method for providing an electromagnetic conduction seal in a device disposed within an electrical enclosure, the method comprising:
- configuring a metal EMC gasket defined by a first end and an opposite second end, said first end is operably secured to the device, at least said second end is allowed to float while remaining in electrical contact with the device;
- fixing a lock strip to the device;
- configuring said lock strip to provide limits of deflection of an intermediate portion of said gasket intermediate said first and second ends; and
- captivating at least one floating end of said gasket, wherein said intermediate portion provides an electromagnetic conduction seal between the device and with at least one of another device and the electrical enclosure.

18. The method of claim 17, wherein said configuring said lock strip to provide limits of deflection of said intermediate portion of said gasket intermediate said first and second ends includes a member extending toward said intermediate portion a distance therefrom representing said limit of deflection.

19. The method of claim 17, wherein said intermediate portion of said gasket is a bight portion configured to flex allowing device extraction and insertion while still making a suitable ground contact.

20. The method of claim 19, wherein said bight portion is segmented transversely along a length defining said gasket to facilitate compression thereof.

* * * * *